United States Patent [19]
Weber et al.

[11] Patent Number: 5,317,667
[45] Date of Patent: May 31, 1994

[54] ELECTROPHORETIC SWITCH FOR A LIGHT PIPE

[75] Inventors: Willes H. Weber; Jeffrey T. Remillard, both of Ann Arbor; John M. Ginder, Plymouth, all of Mich.

[73] Assignee: Ford Motor Company, Dearborn, Mich.

[21] Appl. No.: 980,066

[22] Filed: Nov. 23, 1992

[51] Int. Cl.5 .............................................. G02B 6/22
[52] U.S. Cl. ................................... 385/147; 385/123; 385/127; 359/296
[58] Field of Search ............. 385/147, 4, 11, 123–127; 359/296, 71

[56] References Cited

U.S. PATENT DOCUMENTS

| | | | |
|---|---|---|---|
| 3,408,131 | 10/1968 | Kapany | 385/39 |
| 3,442,568 | 5/1969 | Siegmund et al. | 385/127 |
| 3,770,339 | 11/1973 | Ramaswamy | 385/8 |
| 4,121,884 | 10/1978 | Greenwood | 385/16 |
| 4,123,346 | 10/1978 | Ploix | 359/71 X |
| 4,218,302 | 8/1980 | Dalisa et al. | 359/296 |
| 4,324,456 | 4/1982 | Dalisa | 359/296 |
| 4,648,956 | 3/1987 | Marshall et al. | 359/296 |
| 4,730,171 | 3/1988 | So et al. | 385/2 |
| 4,803,688 | 2/1989 | Lawandy | 372/21 |
| 5,031,996 | 7/1991 | Saller et al. | 385/141 X |
| 5,111,524 | 5/1992 | Schunk et al. | 385/147 X |
| 5,119,461 | 6/1992 | Beyer et al. | 385/147 |

*Primary Examiner*—John D. Lee
*Assistant Examiner*—Phan T. Heartney
*Attorney, Agent, or Firm*—Mark L. Mollon; Roger L. May

[57] ABSTRACT

An electrophoretic light switch is provided for controlling light in a light pipe having a transparent inner conductor, an outer conductor and a solution containing charged particles. Light is absorbed by the solution when the particles are attracted to the inner conductor causing the light intensity in the light pipe to be reduced.

15 Claims, 2 Drawing Sheets

ELECTROPHORETIC SWITCH FOR A LIGHT PIPE

BACKGROUND OF THE INVENTION

The present invention relates generally to a switch for a light pipe, and more specifically to a coaxial electrophoretic device for modulating the intensity of light travelling through a light pipe.

In the operation of light pipes it is often desirable to control the intensity of the light discharge lamps as the light source for light distribution, it is desirable to control the light in the light pipe without modulating the light source. Several methods have been used in the past to control the modulation of the light through the light pipe.

One such method known in the art is controlling a mechanical shutter placed in a gap between two portions of a light pipe. In one position, the shutter blocks the transfer of light from one light pipe to the next; and in another position light is free to pass from one light pipe to the next. One difficulty has been that, due to index of refraction changes as the light travels from the light pipe to air and back into the light pipe, reflections at the light pipe/air interface cause a reduction light intensity. Furthermore the moving mechanical shutter has reliability problems.

Another method used for modulating light is known as the Kerr effect as shown in U.S. Pat. No. 3,442,568. The apparatus has a center electrode which has a cladding of high refractive index glass covered in turn by a Kerr effect material. When the electrode is charged the refractive index of the Kerr effect material changes, causing light to be absorbed into the material and reducing the light transmitted through the glass. One problem with such an apparatus is that having an electrode in the center of the light pipe is not practical in many application.

SUMMARY OF THE INVENTION

It is therefore a primary objective of the present invention to provide a light modulating device which is adapted for use on a standard light pipe without using mechanical parts.

Briefly, a preferred embodiment of the present invention uses electrophoresis to control a coaxial switch for a light pipe having a first index of refraction, a transparent first conductor adjacent to and surrounding the light pipe having a second index of refraction greater than the first index of refraction, a second conductor located substantially concentrically with respect to the light pipe and having an inner diameter greater than first conductor, a solution having a third index of refraction less than the first index of refraction containing charged particles filling the space between the first conductor and the second conductor and a retaining means for holding the second conductor in a fixed location with respect to the first conductor and for retaining the solution in the spaced formed therebetween.

An important advantage of this method of modulating light in a light pipe is that is a highly reproducible and relatively fast having a 100 ms. response time.

DETAILED DESCRIPTION OF THE INVENTION

Figure 1:
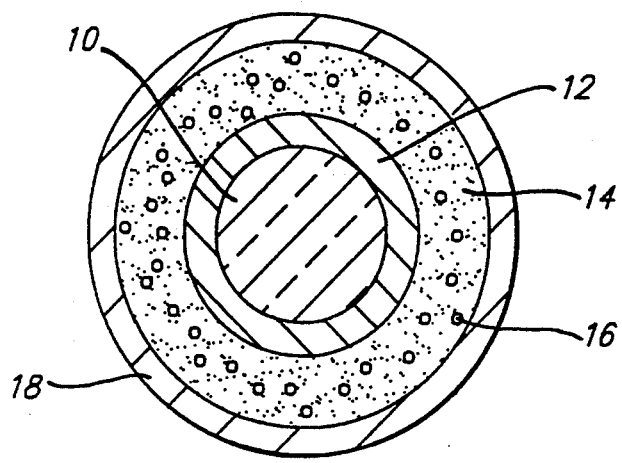
FIG. 1 is an axial cross section of a light pipe of the present invention.
Figure 2:
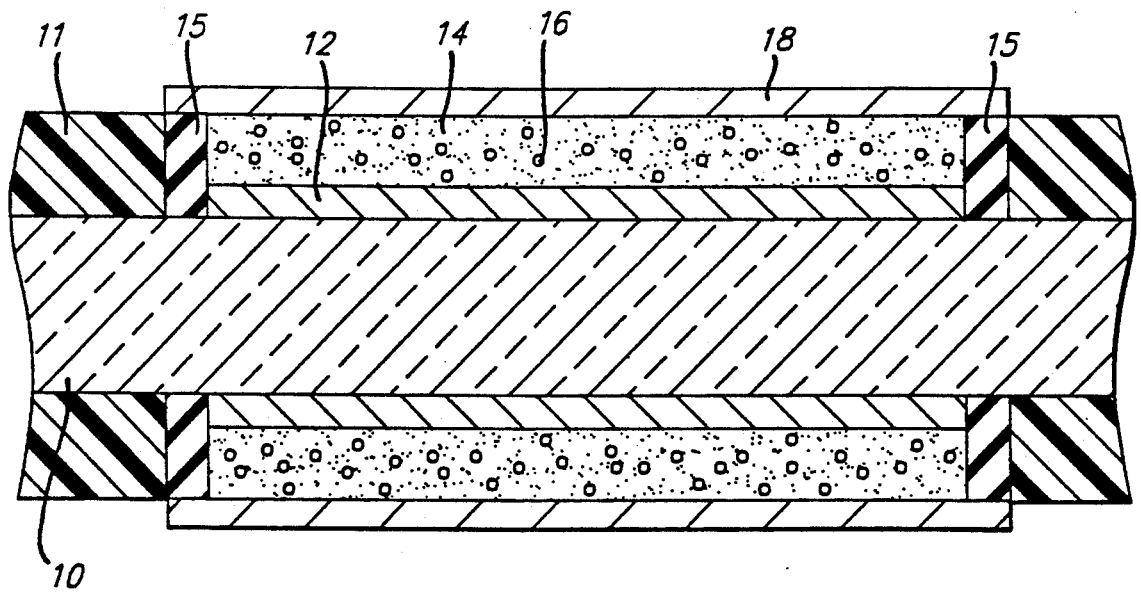
FIG. 2 is a longitudinal cross section of a light pipe of the present invention.

Referring now to FIGS. 1 and 2, cross sectional views of the preferred embodiment are shown. Light pipe 10 is a cylindrical optic element made of a common material such as plastic or glass. Light pipe 10 typically has an insulative cladding 11 which is removed at the location of a switch according to this embodiment. A typical light pipe is one made by the Lumenyte Corp. having a light pipe index of refraction of 1.48 and a cladding index of refraction 1.33. Light pipe 10 is coated with a transparent conductive film having an index of refraction greater than light pipe 10 at the location of the light pipe where the cladding is removed to form a cylindrical inner conductor 12. Inner conductor 12 is comprised for example of indium-tin oxide having an index of refraction of approximately 1.8. A cylindrical outer conductor 18 concentrically surrounds inner conductor 12 forming a space in between. Outer conductor 18 is made of a rigid conductive material such as stainless steel. The inner surface of outer conductor 18 should be coated with an absorbing layer such as black paint to prevent light reflection. Outer conductor 18 is held in a fixed location with respect to inner conductor 12 by a pair of gaskets 15. The space defined by inner conductor 12, outer conductor 18 and gaskets 15 is filled with a colloidal solution 14. Solution 14 can be any transparent, nonconducting liquid whose refractive index is comparable to or slightly smaller than cladding 11 and remains in a liquid state through the operating range of the device, which for automotive applications is −40° C. to 80° C. For example, solution 14 can be actonitrile which has a refractive index of 1.34.

Solution 14 contains particles 16 in suspension having a refractive index different than that of solution 14. Particles 16 must be of the size which will allow them to interact strongly with the light, yet small enough to allow them to move through solution 14 and make close contact with the surface of the light pipe 10. For most applictions 0.1 to 1.0 microns is preferred. Particles 16 should have a non-zero surface charge which most suspensions have by nature. Particles 16 should be of the same or similar density as solution 14 to prevent the particles from settling due to gravity. If the particle density does not match the density of solution 14, particles 16 may have to be resuspended in the solution by agitation. Alternatively, the effects of sedimentation could be reduced by increasing the volume fraction of particles 16. Particles 16 can be for example 0.5 micron polystryene spheres that have a permanent negative charge and a refractive index of about 1.59. For efficient operation of the switch, solution 14 need contain only enough particles to completely coat the charged surface of inner conductor 12.

The switch is manufactured by first stripping the cladding material from a commercially available light pipe. The length of the switch may vary depending on the actual material used and the intensity of the output desired. Using the materials disclosed herein a switch length of approximately 5 cm was used. The bare light pipe 10 is coated with a transparent conductor to form inner conductor 12. Outer conductor 18 having a diameter larger than the inner conductor is then placed concentrically around light pipe 10 in a sleeve-like manner. Outer conductor is held in place by a gasket placed at one end of the switch. The space between inner conductor 12 and outer conductor 18 is filled with the colloidal solution 14. The other end of the switch is sealed with gasket 15 to hold outer conductor 18 and solution 14 in place.

The switches may be manufactured on an existing light pipe or made separately and butt-coupled into an existing light pipe. Butt-coupling switches into a light pipe wherein the refractive index is the same as that in the witch will not cause reflective losses to occur.

Figure 3:
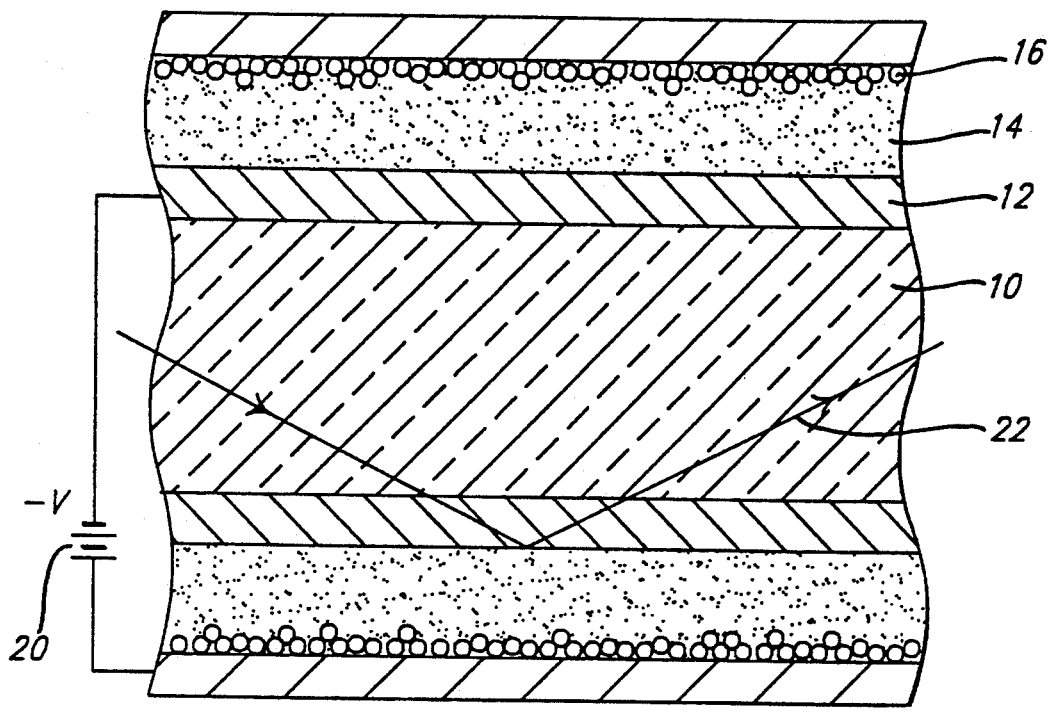
FIG. 3 is a longitudinal cross section of a light pipe of the present invention in the on state.

Referring now to FIG. 3, a longitudinal cross section is shown. The operation of the switch is controlled by a voltage source 20 connected between inner conductor 12 and outer conductor 18. When voltage source 20 places outer conductor 18 at a positive potential with respect to inner conductor 12, negatively charged particles 16 in colloid solution 14 are attracted to positively charged outer conductor 18. Light ray 22 represents light travelling through light pipe 10 which is internally reflected within light pipe 10 when the switch is in the "on" state.

Figure 4:
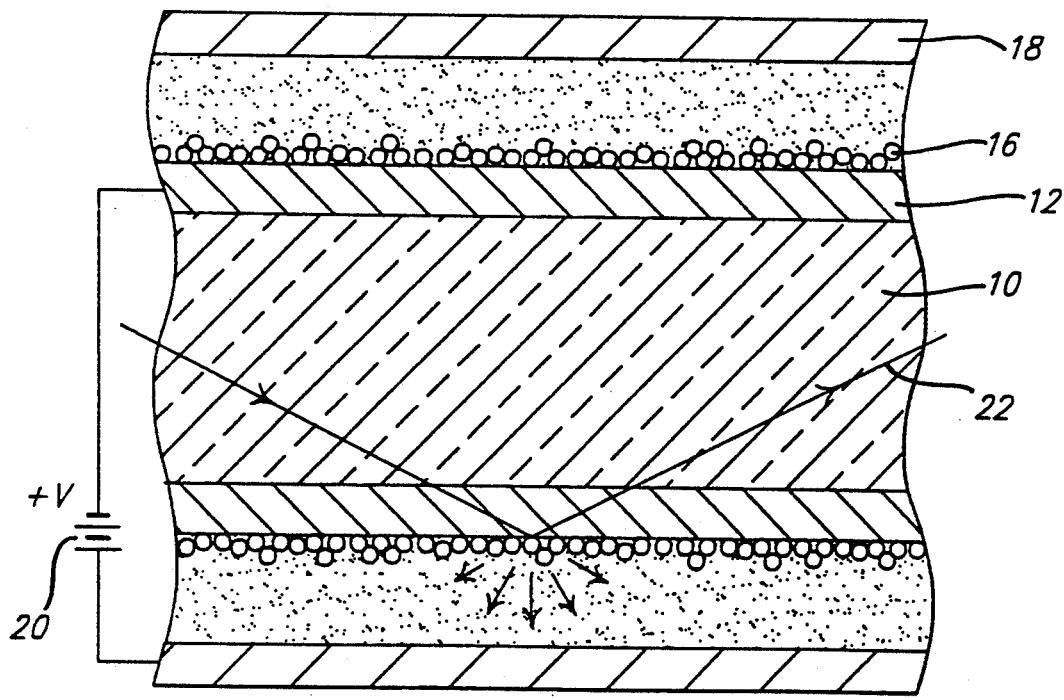
FIG. 4 is a longitudinal cross section of a light pipe of the present invention in the off state.

Referring now to FIG. 4, when voltage source 20 places inner conductor 12 at a positive potential with respect to outer conductor 18, negatively charged particles 16 are attracted to positively charged inner conductor 12. Particles 16 will scatter and/or absorb the light ray 22 in light pipe 10 that would normally undergo total internal reflection. This is referred to as the "off" state. The propagating light enters the solution creating an evanescent field of light around inner conductor 12 extending 0.1 to 0.5 microns into solution 14. The field of light interacts with the particles 16 and reduces the light propagating down the light pipe 10. This electrophoretic phenomenon easily obtains a 50% reduction of light intensity from each reflection at the inner conductor-solution interface which can be altered by changing the geometry of the switch. The response time of such a switch was experimentally found to be 100 ms using the materials disclosed herein.

What is claimed is:

1. A device for modulating light output of a light pipe comprising:
   a light pipe having a first index of refraction;
   a transparent first conductor coating said light pipe having a second index of refraction greater than said first index of refraction;
   a cylindrical second conductor located substantially concentrically with respect to said light pipe and having a diameter greater than or equal to the diameter of said first conductor forming a space therebetween; and
   a solution having a third index of refraction less than said first index of refraction containing charged particles having a fourth index of refraction greater than said third index of refraction filling the space between said first conductor and said second conductor, said charged particles adapted to move in response to a potential difference between said first conductor and said second conductor; and
   retaining means for holding said second conductor in a fixed location with respect to said first conductor and for retaining said solution in said space.

2. A device as in claim 1 wherein said light pipe is comprised of glass.

3. A device as in claim 1 wherein said light pipe is comprised of plastic.

4. A device as in claim 1 wherein said transparent first conductor is comprised of an indium-tin oxide.

5. A device as in claim 1 wherein said second conductor has an inner surface coated with a light absorbing material.

6. A device as in claim 5 wherein said second conductor is comprised of stainless steel.

7. A device as in claim 1 wherein said solution is comprised of acetonitrile.

8. A device as in claim 7 wherein said charged particles are comprised of polystryene spheres.

9. A device as in claim 1 further comprising connection means for coupling respective voltages to said first conductor and said second conductor.

10. A device as in claim 1 further comprising a voltage source electrically connected to said first and second conductors providing a potential difference therebetween.

11. A method for controlling the light output of a light pipe comprising the steps of:
    providing a transparent first conductor adjacent to and surrounding said light pipe, a second conductor located substantially concentrically with respect to said first conductor and forming a space therebetween and a solution containing charged particles filling said space;
    applying a potential difference between said first conductor and said second conductor; and
    controlling the movement of said charged particles in said solution by changing the potential difference of said first conductor with respect to said second conductor.

12. A method as in claim 11 further comprising the steps of:
    creating a evanescent field by the interaction of the light in said light pipe with the charged particles contained in the solution; and
    absorbing the light created by the evanescent field into said solution thereby reducing the light output of the light pipe.

13. A method as in claim 11 wherein said transparent first conductor has an index of refraction equal to or greater than that of said light pipe.

14. A method as in claim 11 wherein said solution has an index of refraction less than the index of refraction of said light pipe.

15. A method as in claim 11 wherein said charged particles have an index of refraction greater than the index of refraction of said solution.

* * * * *